United States Patent
Chang

(10) Patent No.: US 9,687,924 B2
(45) Date of Patent: Jun. 27, 2017

(54) KNOCKDOWN BAND SAW GUIDE SEAT

(71) Applicant: Tung-Wei Chang, Taichung (TW)

(72) Inventor: Tung-Wei Chang, Taichung (TW)

( * ) Notice: Subject to any disclaimer, the term of this patent is extended or adjusted under 35 U.S.C. 154(b) by 37 days.

(21) Appl. No.: 14/824,983

(22) Filed: Aug. 12, 2015

(65) Prior Publication Data

US 2016/0297017 A1  Oct. 13, 2016

(30) Foreign Application Priority Data

Apr. 9, 2015 (TW) .............................. 104205313 U

(51) Int. Cl.
*B23D 55/08* (2006.01)

(52) U.S. Cl.
CPC .................. *B23D 55/082* (2013.01)

(58) Field of Classification Search
CPC .................................................. B23D 55/082
USPC .................. 83/820, 829, 788, 821, 825, 440
See application file for complete search history.

(56) References Cited

U.S. PATENT DOCUMENTS

| | | | | |
|---|---|---|---|---|
| 607,931 A | * | 7/1898 | Hoyt | B23D 55/082 83/820 |
| 4,231,274 A | * | 11/1980 | Matchette | B23D 55/082 279/34 |
| 4,317,400 A | * | 3/1982 | Matchette | B23D 55/082 279/34 |
| 4,920,846 A | * | 5/1990 | Duginske | B23D 55/082 83/820 |
| 4,972,746 A | * | 11/1990 | Ohnishi | B23D 55/005 83/820 |

* cited by examiner

*Primary Examiner* — Omar Flores Sanchez
(74) *Attorney, Agent, or Firm* — Guice Patents PLLC

(57) ABSTRACT

A knockdown band saw guide seat includes multiple separate components. The components can be assembled and connected with each other as building blocks. Accordingly, the relative positions between the assembled components can be respectively adjusted. In addition, the variety, number and position of the assembled components can be changed in accordance with practical requirement to provide necessary function for the operation.

11 Claims, 9 Drawing Sheets

KNOCKDOWN BAND SAW GUIDE SEAT

BACKGROUND OF THE INVENTION

1. Field of the Invention

The present invention relates generally to a band saw machine, and more particularly to a knockdown band saw guide seat.

2. Description of the Related Art

In order to ensure that the band saw of a band saw machine is properly guided and located, conventionally, multiple bearings or guide poles are used to abut against and attach to the faces of the band saw except where the saw teeth are positioned. The bearings or guide poles serve to restrict and guide the band saw to ensure that the band saw is operated without deflecting or displacing. In this case, a work piece can be precisely sawed.

Conventionally, in order to precisely position the bearings or guide poles in adjacency to the faces of the band saw, the bearings or the guide poles are rested on a guide seat, which is securely mounted on the band saw machine in adjacency to the band saw thereof. FIGS. 1 and 2 show a conventional guide seat 1. The guide seat 1 has a guide seat main body 2 on which a back guide wheel 3 is disposed to attach to the back of the band saw. A left adjustment seat 4 and a right adjustment seat 5 are respectively slidably connected in the slide channels formed on two opposite sides of the guide seat main body 2 for carrying multiple rolling bearings 6 in adjacency to two lateral faces of the band saw. Accordingly, the band saw is held between the rolling bearings 6 and the back guide wheel 3.

The conventional guide seat 1 has a slide connection structure between the left and right adjustment seats 4, 5 and the main body 2. The slide connection structure is able to enlarge the range of the adjustable position and state to achieve better locating effect. However, the back guide wheel 3 is directly connected in the fixing hole formed on the main body 2 via shaft rod so that the back guide wheel 3 is limited to a fixed position without possibility of change. Under such circumstance, even though the left and right adjustment seats 4, 5 are movable along with the change of the band saw, the left and right adjustment seats 4, 5 are still restricted to an abutment state in which the back of the band saw and the back guide wheel must keep properly adjacent to each other. As a result, the left and right adjustment seats 4, 5 can hardly provide mobile holding and locating effect for the band saw.

SUMMARY OF THE INVENTION

It is therefore a primary object of the present invention to provide a knockdown band saw guide seat, which includes multiple separate components. The components can be assembled and connected with each other as building blocks. Accordingly, the relative positions between the assembled components can be respectively adjusted. In addition, the assembled components can be changed in accordance with practical requirement to provide necessary function.

To achieve the above and other objects, the knockdown band saw guide seat of the present invention includes: a bed member having a seat section with a predetermined length, a first slide connection section and a second slide connection section with identical shape being respectively disposed on adjacent sides of the seat section, the first and second slide connection sections extending in a lengthwise direction of the seat body; a first assembling member having a first body section, a third slide connection section being formed on the first body section, the third slide connection section having a cross-sectional shape complementary to the cross-sectional shape of the first slide connection section, the third slide connection section being slidably connectable with the first slide connection section; two second assembling members, each of the second assembling members having a second body section, a fourth slide connection section being formed on the second body section, the fourth slide connection section having a cross-sectional shape complementary to the cross-sectional shape of the second slide connection section, the fourth slide connection section being slidably connectable with the second slide connection section; and a locating set having multiple locating members respectively disposed between the first and second body sections and the seat section to restrict relative displacement between the slidably connected first and third slide connection sections or the slidably connected second and fourth slide connection sections.

In the above knockdown band saw guide seat, the bed member further has at least one expansion slide connection section. The expansion slide connection section is disposed on an end face of the seat section, which end face is other than the end faces where the first and second slide connection sections are positioned. The expansion slide connection section extends in the lengthwise direction of the seat section.

In the above knockdown band saw guide seat, the expansion slide connection section has a cross-sectional shape complementary to the cross-sectional shape of the first slide connection section or the second slide connection section.

In the above knockdown band saw guide seat, the cross sections of the first and second slide connection sections are identically dovetail-shaped. The first and second slide connection sections respectively protrude from the corresponding sides of the seat section.

In the above knockdown band saw guide seat, the locating set further includes multiple locating holes respectively disposed on the first and second body sections. Each locating hole has an axis. The axes of the locating holes are normal to the corresponding end faces of the seat section.

In the above knockdown band saw guide seat, the locating members are bolts respectively screwed in the corresponding locating holes. Each bolt has a tail end. The tail ends of the bolts abut against the corresponding first slide connection section or the second slide connection section.

In the above knockdown band saw guide seat, the first assembling member further has a first shaft hole formed through the first body section and each second assembling member further has a second shaft hole formed through the second body section. The first shaft hole has an axis. The second shaft hole also has an axis. The axes of the first and second shaft holes are parallel to each other.

In the above knockdown band saw guide seat, each second assembling member further includes a fifth slide connection section. The fifth slide connection section is formed on an end face of the second body section, which end face other than the end face where the fourth slide connection section is positioned. The fifth slide connection section has a cross-sectional shape complementary to the cross-sectional shape of the second slide connection section. The fifth slide connection section is slidably connectable with the second slide connection section.

In the above knockdown band saw guide seat, when the fifth slide connection sections of the second assembling members are slidably disposed on the second slide connection section, the fourth slide connection sections face each other.

In the above knockdown band saw guide seat, the fourth and fifth slide connection sections are dovetail channels.

The present invention can be best understood through the following description and accompanying drawings, wherein:

DETAILED DESCRIPTION OF THE PREFERRED EMBODIMENTS

Figure 1:
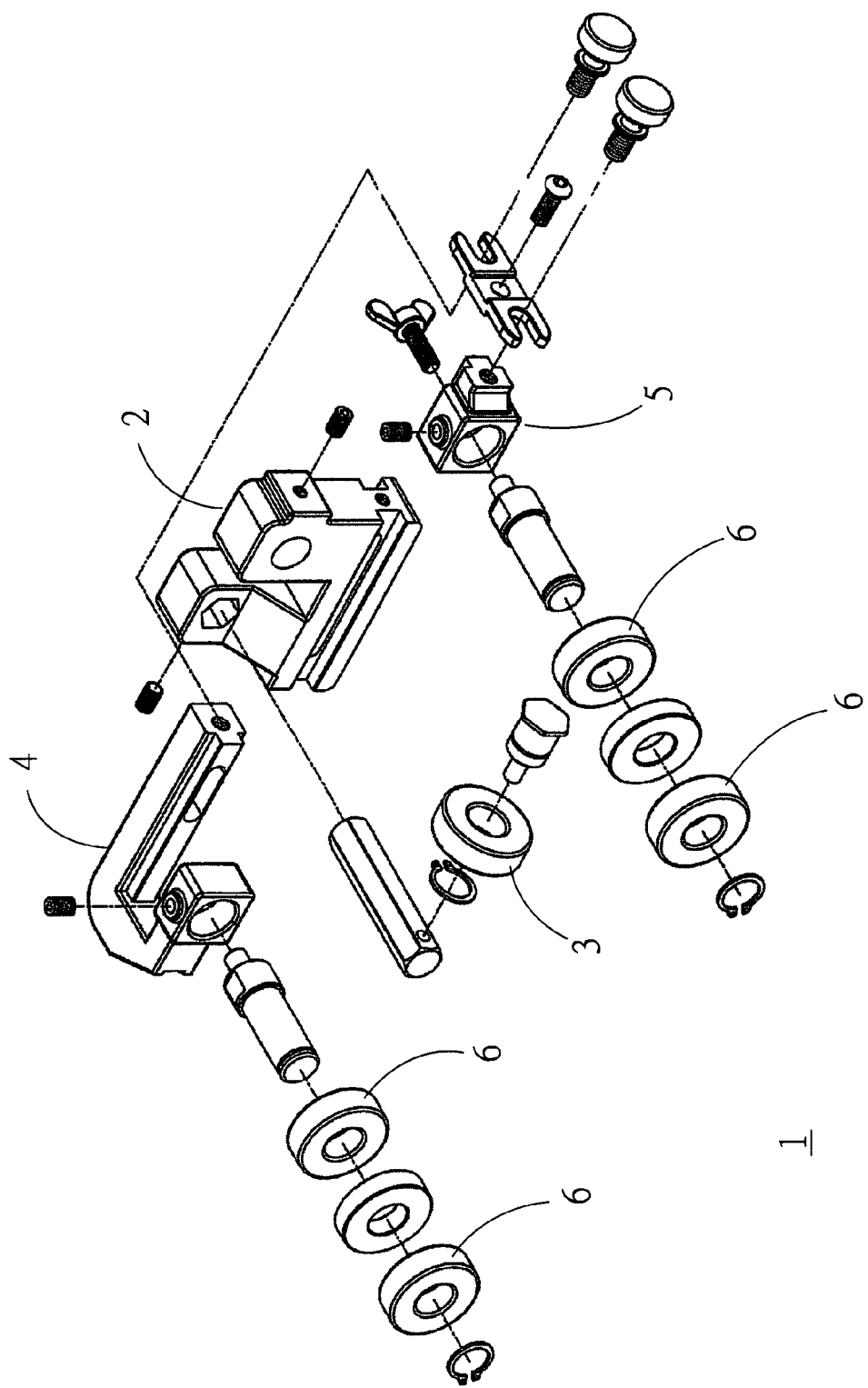
FIG. 1 is a perspective exploded view of a conventional band saw guide seat.
Figure 2:
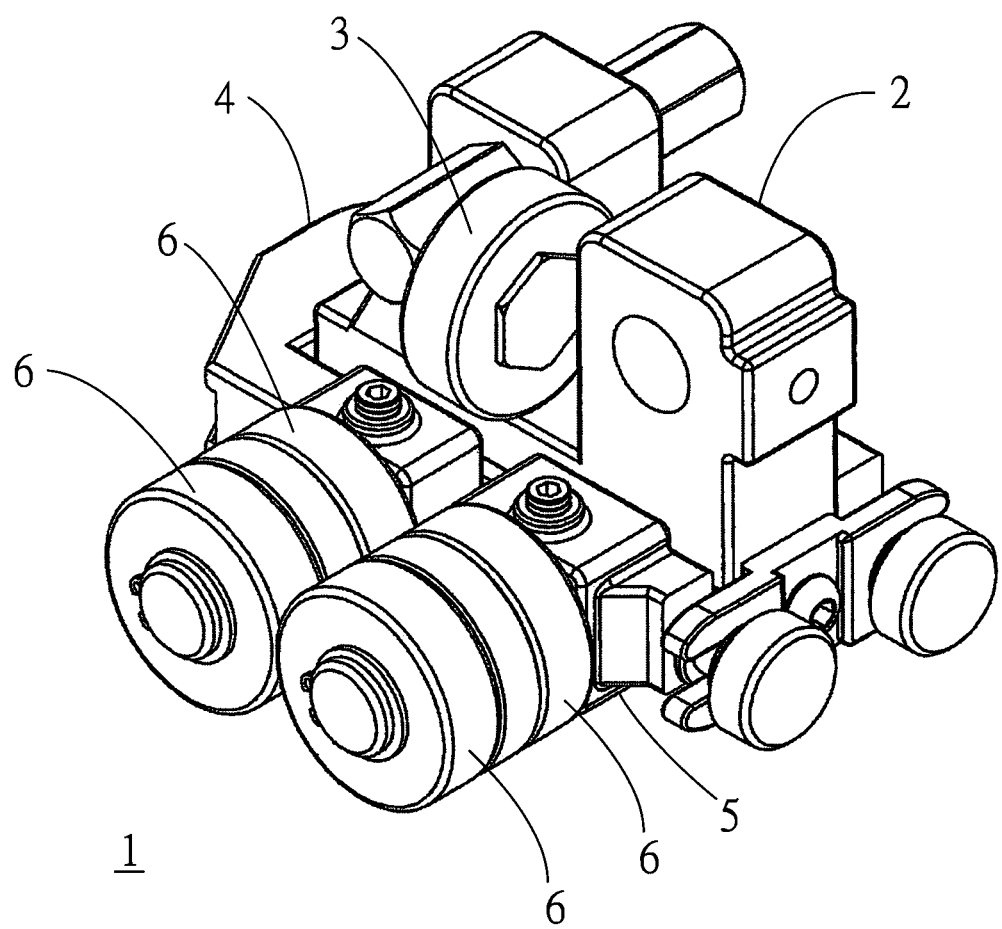
FIG. 2 is a perspective assembled view of the conventional band saw guide seat.
Figure 3:
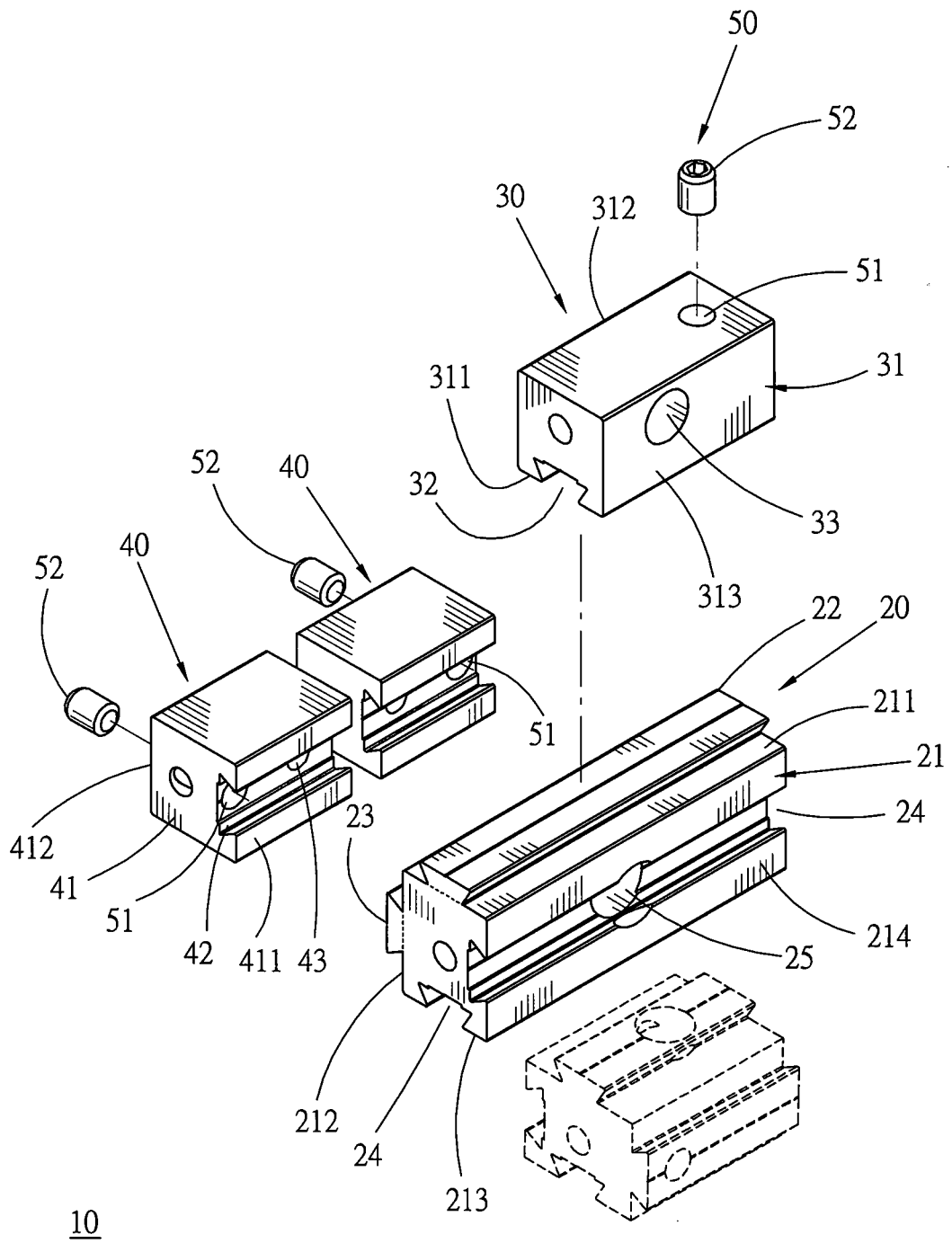
FIG. 3 is a perspective exploded view of a first embodiment of the present invention.
Figure 4:
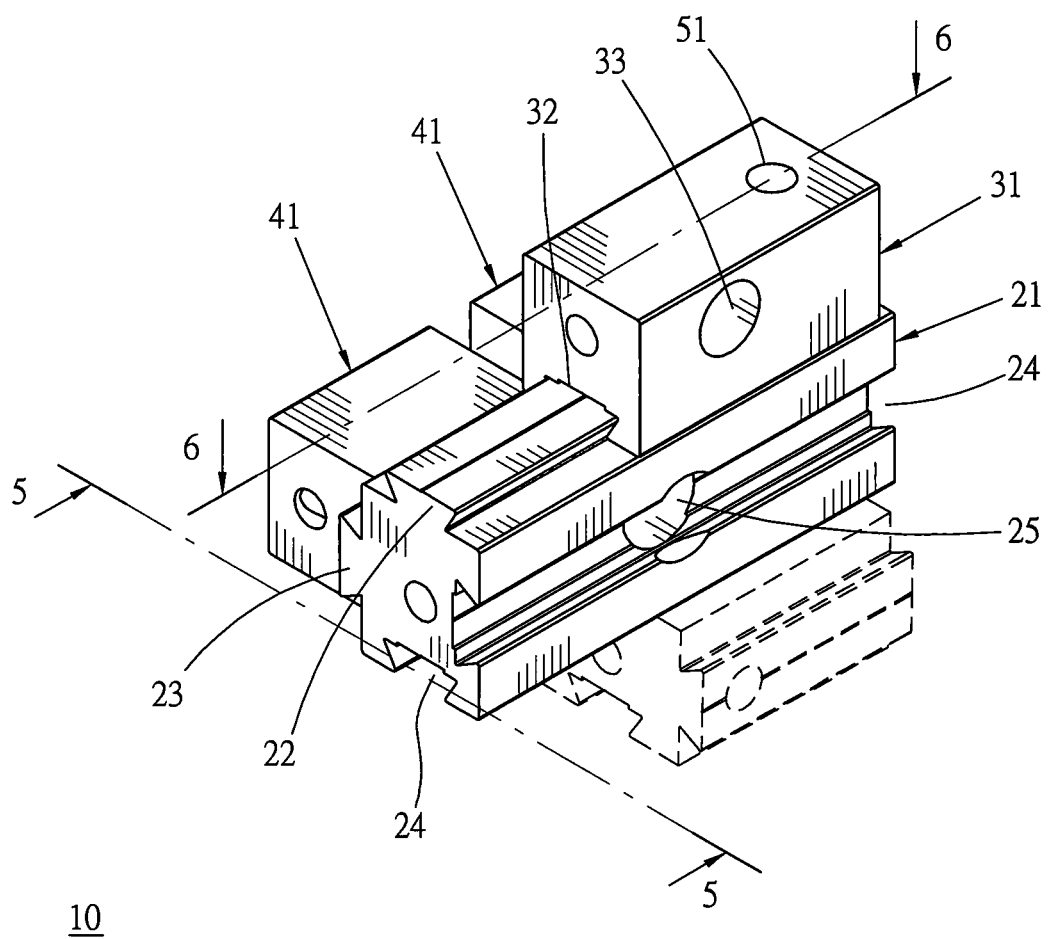
FIG. 4 is a perspective assembled view of the first embodiment of the present invention.
Figure 5:
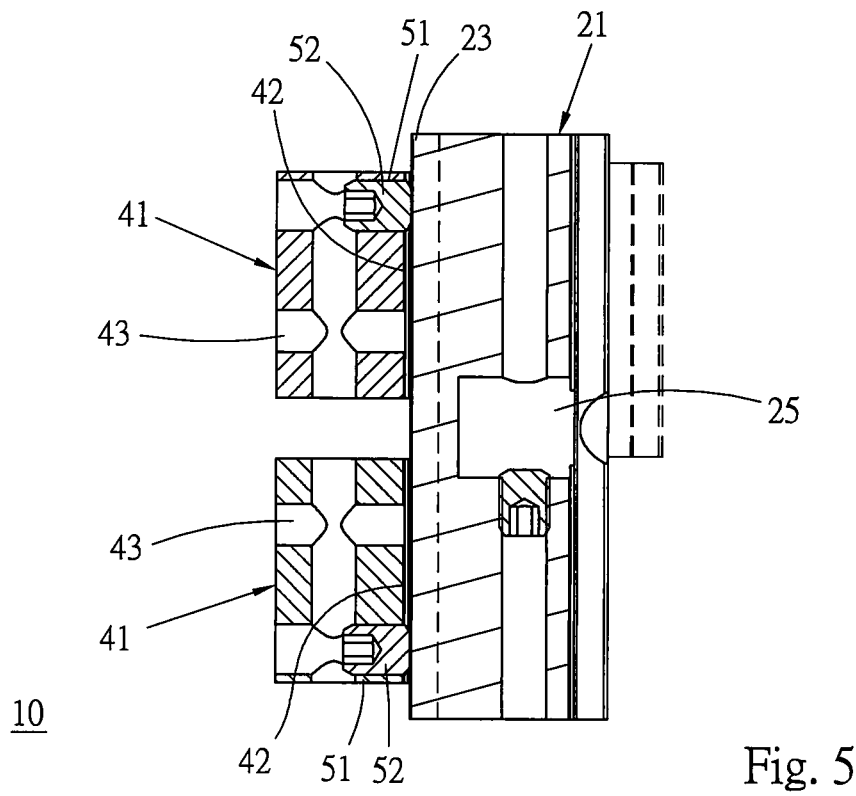
FIG. 5 is a sectional view of the first embodiment of the present invention, taken along line 5-5 of FIG. 3.
Figure 6:
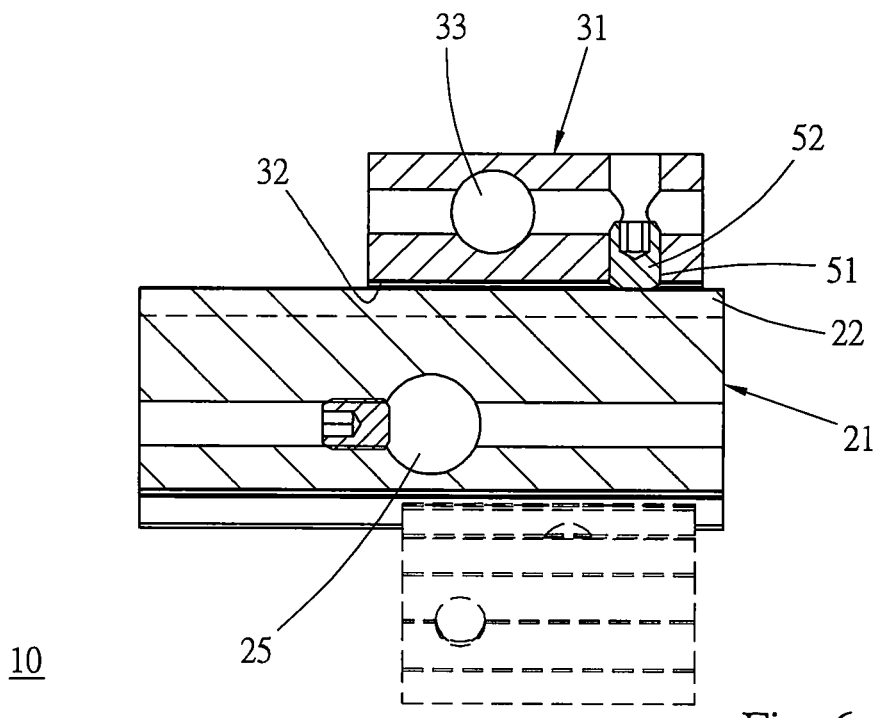
FIG. 6 is a sectional view of the first embodiment of the present invention, taken along line 6-6 of FIG. 3.

Please refer to FIGS. 3 to 6. According to a first embodiment, the knockdown band saw guide seat 10 of the present invention includes a bed member 20, a first assembling member 30, two second assembling members 40 and a locating set 50.

The bed member 20 has a cuboidal seat section 21 with a certain length. The seat section 21 has an upper end face 211 and a left end face 212 in adjacency to each other. A first slide connection section 22 with a dovetail-shaped cross section and a second slide connection section 23 with an identical dovetail-shaped cross section are respectively disposed on the upper end face 211 and the left end face 212 of the seat section 21 to protrude from the upper end face 211 and the left end face 212. The first and second slide connection sections extend in a lengthwise direction of the seat body 21 in parallel to each other. The seat section 21 further has a bottom end face 213 and a right end face 214 in adjacency to each other. The bottom end face 213 and the right end face 214 extend in the lengthwise direction of the seat body 21 in parallel to each other. Two expansion slide connection sections 24 are respectively formed on the bottom end face 213 and the right end face 214 of the seat section 21. The expansion slide connection sections 24 are two dovetail channels with a shape complementary to the shape of the first and second slide connection sections 22, 23. A connection blind hole 25 is formed on the right end face 214 of the seat section 21. The axis of the connection blind hole 25 is normal to the length of the seat section 21.

The first assembling member 30 has a cuboidal first body section 31 with a certain length and a width equal to the width of the upper end face 211 of the seat section 21. The length of the first body section 31 is about one half the length of the seat section 21. The first body section 31 has a bottom end face 311 extending in the lengthwise direction of the first body section 31. A third slide connection section 32 is formed on the bottom end face 311. The third slide connection section 32 is a dovetail channel with a cross-sectional shape complementary to that of the first slide connection section 22. The third slide connection section 32 extends in the lengthwise direction of the first body section 31 to slidably connect with the first slide connection section 22, whereby the first assembling member 30 can be slidably disposed on the seat body 21. A first shaft hole 33 is formed through the first body section 31 between a left end face 312 and a right end face 313 of the first body section 31. The axis of the first shaft hole 33 is normal to the length of the first body section 31.

Each of the second assembling members 40 has a cuboidal second body section 41 with a shorter length. The second body section 41 has a right end face 411 extending in the lengthwise direction of the second body section 41. A fourth slide connection section 42 is formed on the right end face 411. The fourth slide connection section 42 is a dovetail channel with a cross-sectional shape complementary to that of the second slide connection section 23. The fourth slide connection section 42 extends in the lengthwise direction of the second body section 41 to slidably connect with the second slide connection section 23, whereby the second assembling member 40 can be slidably disposed on the seat body 21. A second shaft hole 43 is formed through the second body section 41 between a front end face 412 and a rear end face 411 of the second body section 41. The axis of the second shaft hole 43 is normal to the length of the second body section 41 and parallel to the axis of the first shaft hole 33.

The locating set 50 is used to locate the first and second assembling members 30, 40 on the seat section 21 in a relative position. The locating set 50 includes multiple locating holes 51 respectively disposed in the first and second body sections 31, 41. The axes of the locating holes 51 are normal to the corresponding end faces of the seat section 21, on which the first and second body sections 31, 41 are respectively slidably connected. The locating set 50 further includes multiple locating members 52, which are bolts screwed in the corresponding locating holes 51. The tail ends of the bolts 52 abut against the dovetail faces of the corresponding first slide connection section 22 or the second slide connection section 23. Accordingly, by means of the tightening of the locating members 52, the first and second assembling members 30, 40 are securely connected and located on the seat section 21.

According to the above arrangement, the bed member 20 of the knockdown band saw guide seat 10 serves as a main body and the first and second assembling members 30, 40 can be respectively independently moved on the first and second slide connection sections 22, 23 to a desired position according to the necessary relative position without obstructing or affecting each other. Accordingly, even if the position of the connection blind hole 25 of the bed member 20 for mounting on the band saw machine has a larger processing error, the respective components can be independently moved to adjust the necessary relative position to a state where the band saw can be still properly guided and held.

As aforesaid, the first and second assembling members 30, 40 can be disposed on the first and second slide connection sections 22, 23 of the bed member 20. In addition, some extra components can be further slidably connected on the first and second slide connection sections 22, 23 or he expansion slide connection sections 24 according to practical use requirement. In this case, another component in the form of a block body necessary for the operation can be directly connected onto the bed member 20 (as shown by the phantom lines of FIG. 3). This can enhance the mobility, convenience and expandability of the knockdown band saw guide seat 10 in use.

Figure 7:
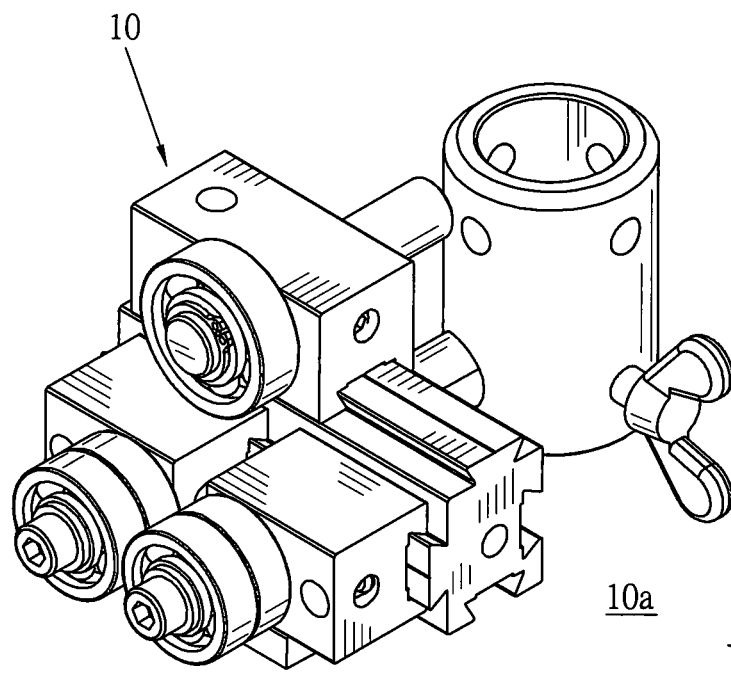
FIG. 7 is a perspective view showing that the first embodiment of the present invention is used as an upper guide seat of the band saw of the band saw machine.
Figure 8:
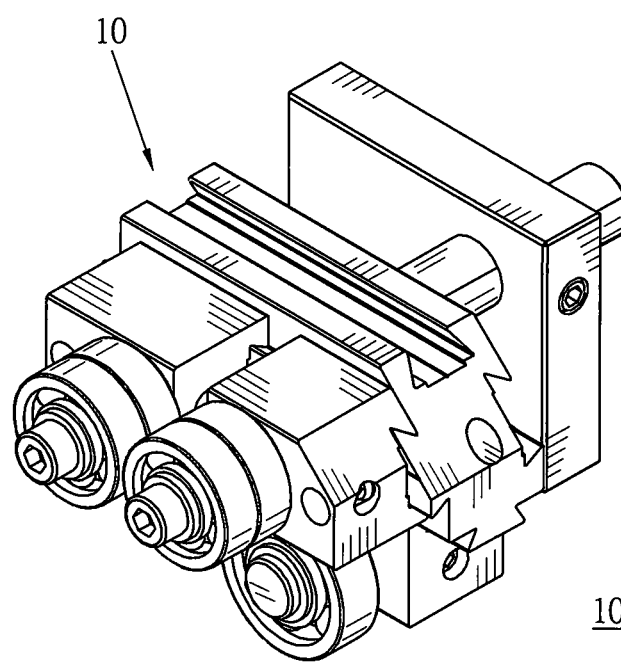
FIG. 8 is a perspective view showing that the first embodiment of the present invention is used as a lower guide seat of the band saw of the band saw machine.

With respect to the practical use, the knockdown band saw guide seat 10 can serve as an upper guide seat 10a of the band saw of a band saw machine as shown in FIG. 7. Alternatively, the knockdown band saw guide seat 10 can serve as a lower upper guide seat 10b of the band saw of a band saw machine as shown in FIG. 8. In comparison with the conventional technique, the knockdown band saw guide seat 10 of the present invention has enhanced function and better effect.

Figure 9:
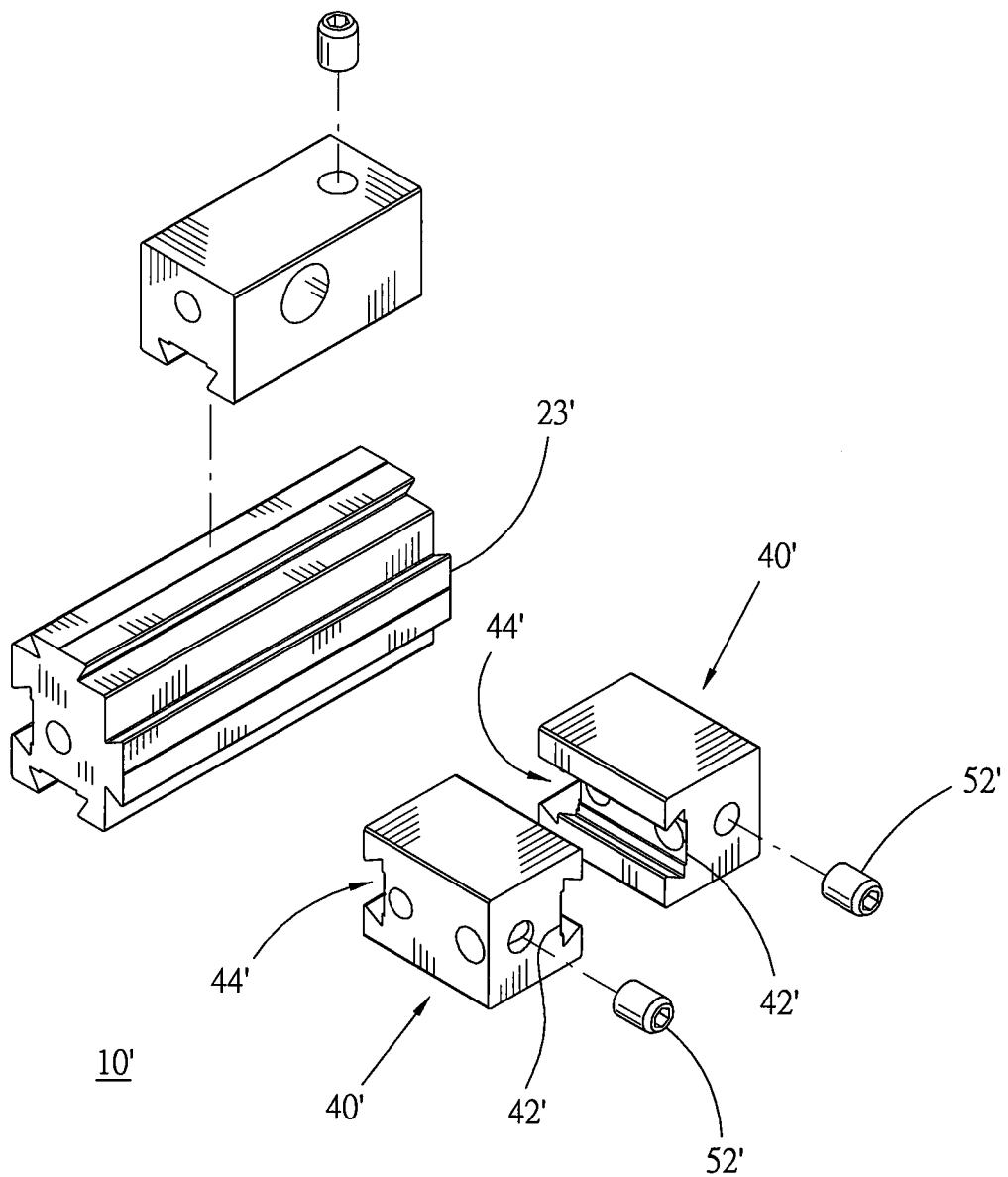
FIG. 9 is a perspective exploded view of a second embodiment of the present invention.
Figure 10:
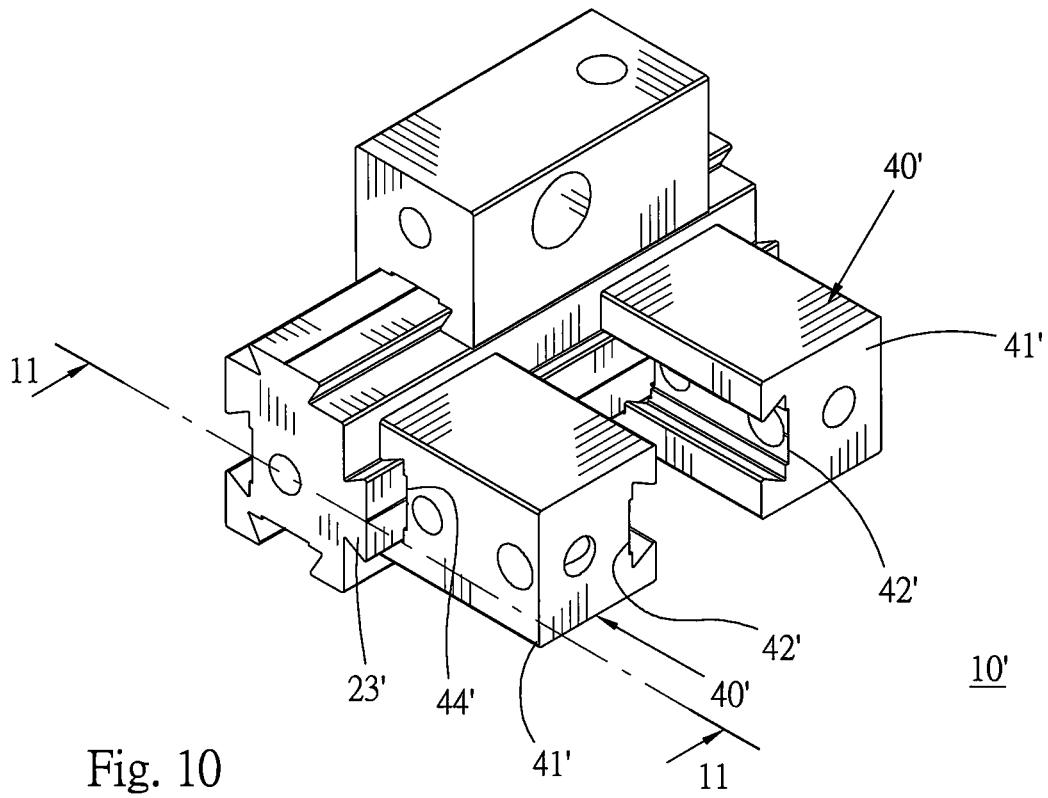
FIG. 10 is a perspective assembled view of the second embodiment of the present invention.
Figure 11:
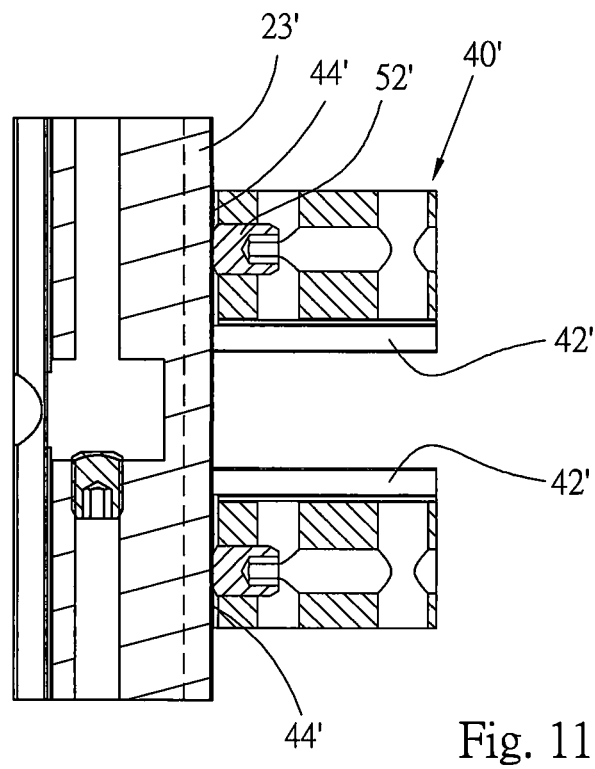
FIG. 11 is a sectional view of the second embodiment of the present invention, taken along line 11-11 of FIG. 10.

Please now refer to FIGS. 9 to 11, which show a second embodiment of the knockdown band saw guide seat 10' of the present invention. The second embodiment is substantially identical to the first embodiment in technical content. The second embodiment is different from the first embodiment in that the second assembling member 40' further includes a fifth slide connection section 44'. The fifth slide connection section 44' is formed on the end face of one end of the cuboidal second body section 41', which end face is adjacent to the end face where the fourth slide connection section 42' is positioned. The cross-sectional shape of the fifth slide connection section 44' is identical to that of the fourth slide connection section 42'. The fifth slide connection section 44' is also a dovetail channel in which the second slide connection section 23' can be slidably dovetailed.

Figure 12:
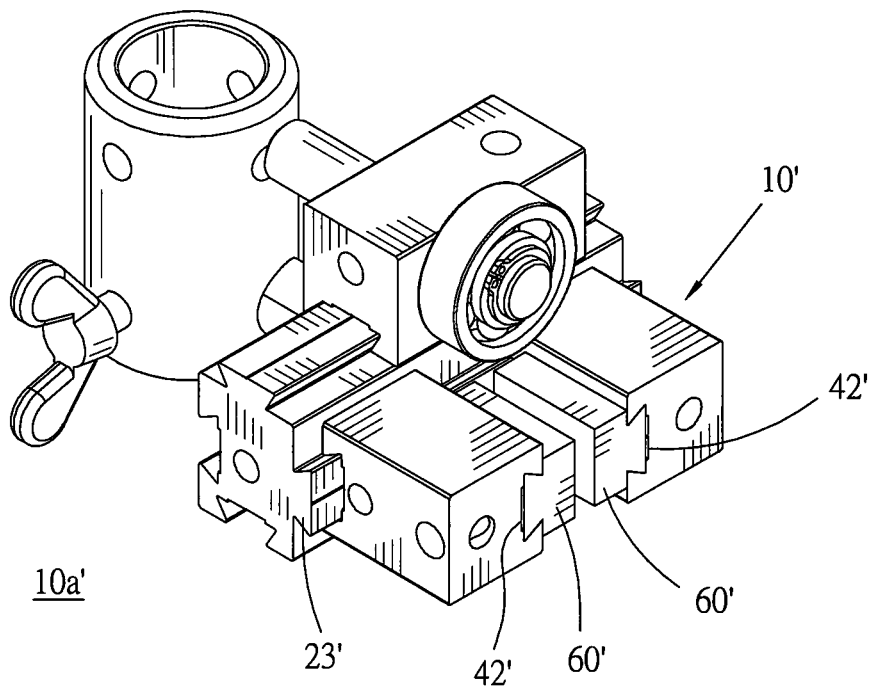
FIG. 12 is a perspective view showing that the second embodiment of the present invention is used as an upper guide seat of the band saw of the band saw machine.
Figure 13:
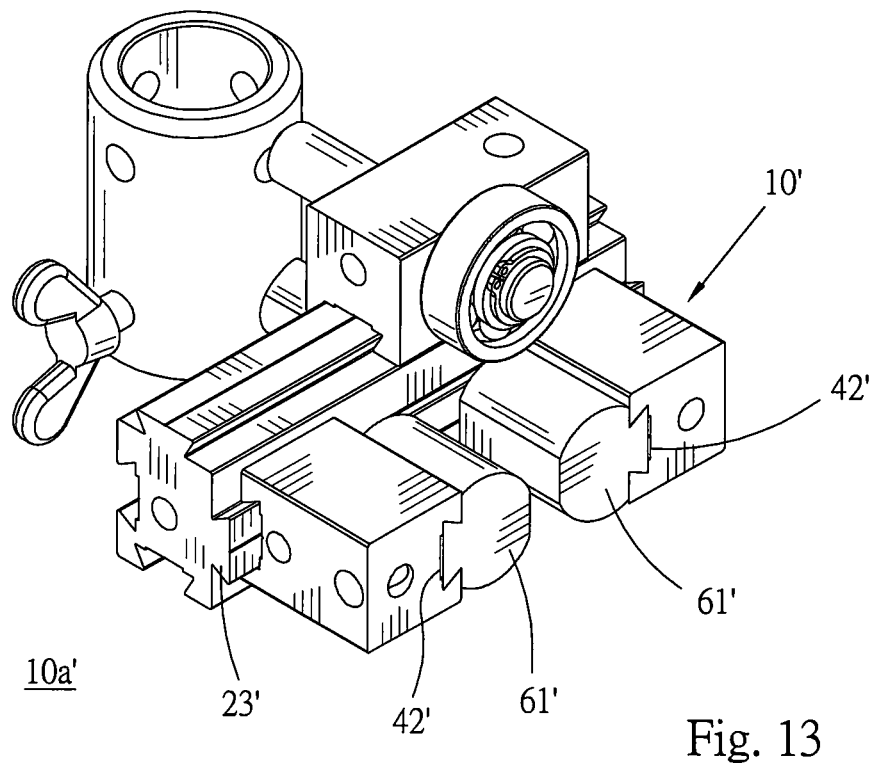
FIG. 13 is a perspective view showing that the second embodiment of the present invention is used as a lower guide seat of the band saw of the band saw machine.

Accordingly, when assembling the knockdown band saw guide seat 10', the fifth slide connection section 44' of the second assembling member 40' can be slidably disposed on the second slide connection section 23' and locked and located with the corresponding locating members 52'. Under such circumstance, the fourth slide connection sections 42' can be positioned at an interval with their openings facing each other. In this case, an upper guide seat 10a' of the band saw of the band saw machine is achieved as shown in FIG. 12 or 13. Some guide blocks 60', 61' are made of bakelite or ceramic material with different shapes. The guide blocks 60', 61' have dovetail sections. The shape of the dovetail sections is identical to the shape of the second slide connection section 23'. The guide blocks 60', 61' are directly slidably disposed in the fourth slide connection section 42' in pair to hold and locate the band saw therebetween and guide the band saw.

The above embodiments are only used to illustrate the present invention, not intended to limit the scope thereof. Many modifications of the above embodiments can be made without departing from the spirit of the present invention.

What is claimed is:

1. A knockdown band saw guide seat comprising:
    a bed member having a seat section with a predetermined length, a first slide connection section and a second slide connection section with identical shape being respectively disposed on adjacent sides of the seat section, the first and second slide connection sections extending in a lengthwise direction of the seat body;
    a first assembling member having a first body section, a third slide connection section being formed on the first body section, the third slide connection section having a cross-sectional shape complementary to the cross-sectional shape of the first slide connection section, the third slide connection section being slidably connectable with the first slide connection section;
    two second assembling members, each of the second assembling members having a second body section, a fourth slide connection section being formed on the second body section, the fourth slide connection section having a cross-sectional shape complementary to the cross-sectional shape of the second slide connection section, the fourth slide connection section being slidably connectable with the second slide connection section; and
    a locating set having multiple locating members respectively disposed between the first and second body sections and the seat section to restrict relative displacement between the slidably connected first and third slide connection sections or the slidably connected second and fourth slide connection sections;
    wherein the bed member further has at least one expansion slide connection section, the expansion slide connection section being disposed on an end face of the seat section, which end face is other than the end faces where the first and second slide connection sections are positioned, the expansion slide connection section extending in the lengthwise direction of the seat section.

2. The knockdown band saw guide seat as claimed in claim 1, wherein the expansion slide connection section has a cross-sectional shape complementary to the cross-sectional shape of the first slide connection section or the second slide connection section.

3. The knockdown band saw guide seat as claimed in claim 1, wherein the cross sections of the first and second slide connection sections are identically dovetail-shaped, the first and second slide connection sections respectively protruding from the corresponding sides of the seat section.

4. The knockdown band saw guide seat as claimed in claim 2, wherein the cross sections of the first and second slide connection sections are identically dovetail-shaped, the first and second slide connection sections respectively protruding from the corresponding sides of the seat section.

5. A knockdown band saw guide seat comprising:
    a bed member having a seat section with a predetermined length, a first slide connection section and a second slide connection section with identical shape being respectively disposed on adjacent sides of the seat section, the first and second slide connection sections extending in a lengthwise direction of the seat body;
    a first assembling member having a first body section, a third slide connection section being formed on the first body section, the third slide connection section having a cross-sectional shape complementary to the cross-sectional shape of the first slide connection section, the third slide connection section being slidably connectable with the first slide connection section;
    two second assembling members, each of the second assembling members having a second body section, a fourth slide connection section being formed on the second body section, the fourth slide connection section having a cross-sectional shape complementary to the cross-sectional shape of the second slide connection section, the fourth slide connection section being slidably connectable with the second slide connection section; and a locating set having multiple locating members respectively disposed between the first and second body sections and the seat section to restrict relative displacement between the slidably connected first and third slide connection sections or the slidably connected second and fourth slide connection sections;

wherein the locating set further includes multiple locating holes respectively disposed on the first and second body sections, each locating hole having an axis, the axes of the locating holes being normal to the corresponding end faces of the seat section.

6. The knockdown band saw guide seat as claimed in claim 5, wherein the locating members are bolts respectively screwed in the corresponding locating holes, each bolt having a tail end, the tail ends of the bolts abutting against the corresponding first slide connection section or the second slide connection section.

7. The knockdown band saw guide seat as claimed in claim 1, wherein the first assembling member further has a first shaft hole formed through the first body section, each second assembling member further having a second shaft hole formed through the second body section, the first shaft hole having an axis, the second shaft hole also having an axis, the axes of the first and second shaft holes being parallel to each other.

8. A knockdown band saw guide seat comprising:

a bed member having a seat section with a predetermined length, a first slide connection section and a second slide connection section with identical shape being respectively disposed on adjacent sides of the seat section, the first and second slide connection sections extending in a lengthwise direction of the seat body;

a first assembling member having a first body section, a third slide connection section being formed on the first body section, the third slide connection section having a cross-sectional shape complementary to the cross-sectional shape of the first slide connection section, the third slide connection section being slidably connectable with the first slide connection section;

two second assembling members, each of the second assembling members having a second body section, a fourth slide connection section being formed on the second body section, the fourth slide connection section having a cross-sectional shape complementary to the cross-sectional shape of the second slide connection section, the fourth slide connection section being slidably connectable with the second slide connection section; and a locating set having multiple locating members respectively disposed between the first and second body sections and the seat section to restrict relative displacement between the slidably connected first and third slide connection sections or the slidably connected second and fourth slide connection sections;

wherein each second assembling member further includes a fifth slide connection section, the fifth slide connection section being formed on an end face of the second body section, which end face other than the end face where the fourth slide connection section is positioned, the fifth slide connection section having a cross-sectional shape complementary to the cross-sectional shape of the second slide connection section, the fifth slide connection section being slidably connectable with the second slide connection section.

9. The knockdown band saw guide seat as claimed in claim 8, wherein when the fifth slide connection sections of the second assembling members are slidably disposed on the second slide connection section, the fourth slide connection sections face each other.

10. The knockdown band saw guide seat as claimed in claim 8, wherein the fourth and fifth slide connection sections are dovetail channels.

11. The knockdown band saw guide seat as claimed in claim 9, wherein the fourth and fifth slide connection sections are dovetail channels.

* * * * *